Sept. 27, 1932.  R. H. SIMONDS  1,879,827
OPHTHALMIC MOUNTING
Filed March 30, 1928
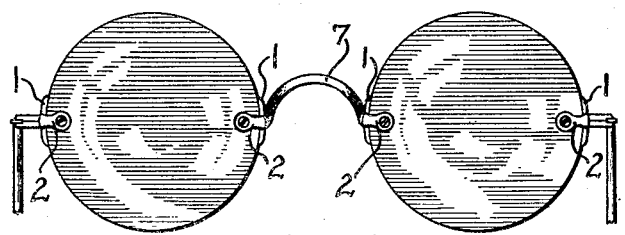
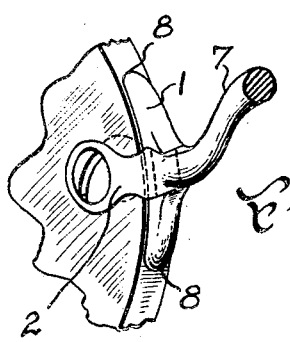
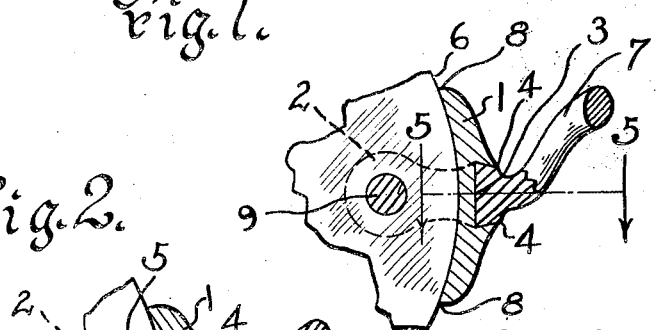
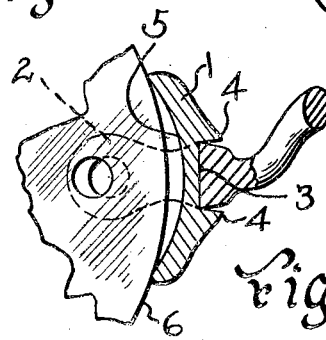
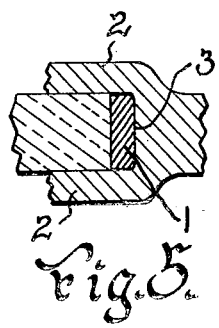
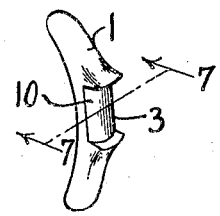
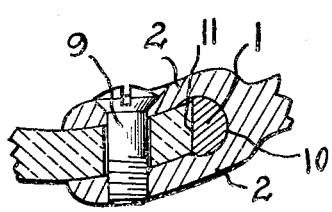
Inventor
Royal H. Simonds.
By Harry H. Styll.
Attorney Patented Sept. 27, 1932

1,879,827

UNITED STATES PATENT OFFICE

ROYAL H. SIMONDS, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS

OPHTHALMIC MOUNTING

Application filed March 30, 1928. Serial No. 265,985.

This invention relates to improvements in ophthalmic mountings and has particular reference to an improved lens strap for the same.

The principal object of the invention is to provide a stiff strap that will not lose its hardness or temper due to soldering the bridge to the lens ears.

Another object of the invention is to provide a stiff strap for the edge of the lens, the points of which will not back off and allow the lens to work on the lens screw.

Another object of the invention is to provide a separate lens strap that will tighten itself on the lens ears when the strap is fitted to the edge of the lens.

Another object of the invention is to provide an improved lens strap that will adjust itself to the edge of the lens.

Another object of the invention is to provide improved means by which a separate lens strap will tighten itself on the lens clip when the strap is adjusted to the edge of the lens.

Another object of the invention is to provide a lens strap that will have increased stiffness along the edge of the lens and will not back away therefrom and allow the lens to become loose in its mounting.

Another object of the invention is to provide improved means for holding a lens which will not be subject to the softening effects of soldering the lens and bridge connections together.

Other objects and advantages of the invention will be apparent from the following description taken in connection with the accompanying drawing, and it will be apparent that many changes may be made in the arrangement of parts and details of construction without departing from the spirit of the invention as expressed in the accompanying claims. I, therefore, do not wish to be limited to the exact details shown and described as the preferred forms only have been shown by way of illustration.

Referring to the drawing:

Fig. 1 is a front view of an ophthalmic mounting embodying the invention;

Fig. 2 is an enlarged fragmentary perspective view of a lens connection embodying the invention;

Fig. 3 is a partial elevation partially in cross section showing the connection of the lens strap to the bridge before the strap is fitted to the edge of the lens;

Fig. 4 is a view similar to Fig. 3 showing the connection of the strap to the bridge after the strap has been fitted to the lens;

Fig. 5 is a cross section on line 5—5 of Fig. 4;

Fig. 6 is a perspective view of the lens strap removed from the lens connection showing a modified form;

Fig. 7 is a cross section on line 7—7 of Fig. 6;

Fig. 8 is a view in cross section similar to Fig. 5 showing the modified form of strap shown in Fig. 6.

In the prior art the lens strap and lens ears of the lens connection were usually made in one integral part and soldered to the end of the bridge. The soldering operation drew the temper of the strap ear and made it soft so that the extremities or ends of the strap ear would back away from the lens and allow it to work on the lens screw and become loose. Various means have been tried to stiffen the lens strap to overcome this defect due to soldering connections together. This has been done by swaging or hammering operations and the dimensions of the strap have been increased without avail.

It is, therefore, the prime object of my invention to provide a lens strap that will be stiff and retain its position on the edge of the lens and will not back away from the same and allow the lens to become loose, and a rigid and stiff strap may be had which will always maintain the lens in desired position where it cannot work loose on the lens connecting screw. This is a matter of the first importance as practically all the lens connections in the prior art became loose due to the backing out of the ends of the strap. It is a well recognized defect in ophthalmic mountings and one that has received the attention of practically the inventive resources of the whole art.

Referring to the drawing, wherein similar reference characters denote corresponding parts throughout, I make my lens strap 1 in a separate piece from the lens ears 2. On the bridge side of the strap 1 I form the connecting recess or socket 3 which has the projecting edges or points 4. I also make the edge 5 which contacts with the edge 6 of the lens more concave than the edge of the lens, as indicated in Fig. 3. The bridge 7 is secured to the lens ears 2 and has a bearing surface which fits the recess 3 in the strap 1 as indicated in Figs. 3 and 4. It will be seen by reference to Fig. 3 that before the edge 5 of the strap 1 has been shaped to fit the edge 6 of the lens, there is an open space at the points 4, but that when the strap has been shaped up to fit the edge 6 of the lens these openings at 4 are closed up as shown in Fig. 4 and the strap 1 is thus clamped over the portion of the bridge 7 which projects into the recess 3 of the strap, thereby interlocking the two members. The strap 1 is made of hard, stiff, well tempered material that is not easily bent or deflected from position and is of sufficient strength to prevent the ends 8 from backing away from the lens to allow the lens to work on the lens screw 9.

In Figs. 4 and 5 the bottom of the recess 3 in the strap 1 is indicated as a straight line. This may, however, be made curved in cross section as shown at 10 in Figs. 6, 7 and 8. Where the bottom of the recess 3 is made curved as indicated by 10 the recess between the ears 2 is correspondingly curved to fit as shown in Fig. 8. The advantage of the curved recess is that it will allow the strap 1 to adjust itself to the edge 11 of the lens as indicated in Fig. 8 so that the strap is self-adjusting to the edge of the lens and to its connection with the lens ears.

It will be understood also that if desired the strap 1 may be made of springy or resilient material of high temper which will have a tendency to always have the points 8 bearing tightly against the edge of the lens and being made separate from the bridge connection the temper of the resilient strap 1 will not be drawn as has been the case in the prior art.

The operation and assembly are as follows: The strap 1 is placed between the lens ears 2 with the recess 3 on the end of the bridge as indicated in Fig. 3, the points 4 spanning said bridge portion. The lens is pressed in between the ears 2 forcing back the edge 5 of the strap 1 until it assumes the position shown in Fig. 4, the edge 5 fitting the edge 6 of the lens. The screw 9 is then placed in the screw hole in the ears 2 and screwed up tight. During this operation of pressing back the edge 5 the openings 4 are closed up so that they bear on the portion of the bridge fitting in the recess 3 as indicated in Fig. 4. Where the bottom of the recess 3 is curved as at 10 in Fig. 6 the strap 1 adjusts itself to the edge 11 of the lens before its final position has been reached and the device is then tightened as before to maintain its adjusted position.

In Fig. 5 it will be noted that the strap 1 does not have the rounded bottom for the recess but has a straight edge.

From the foregoing description it will be seen that I have provided means by which a lens strap may be fitted to the edge of the lens without having its temper drawn by the soldering operations in fastening the bridge to the lens connections so that the same may be of sufficient temper to maintain itself in close engagement at all times with the edge of the lens and will not back away and allow the lens to work loose on the screw connections, and also that I have provided means by which the strap may adjust itself to the edge of the lens which is fitted between the lens ears, thus forming a device well able to carry out all of the advantages of the invention and which is simple, efficient and economical in its construction.

Having described my invention, I claim:

1. In a device of the character described, a lens holding member and a flexible member in engagement with said lens holding member and adapted to engage the edge of the lens, said member having a concaved surface on the lens engaging side and a reentrant portion on the opposite side thereof, a portion of the lens holding member being inserted in said reentrant portion and the upper and lower walls of the reentrant portion being of a shape to provide a clearance space between the outer edges of said walls and the lens holding member, said flexible member being most flexible between the limits of said reentrant portion whereby when the member in engagement with said lens holding member is straightened to make the concaved surface less concave it will flex between the limits of said reentrant portion and cause the upper and lower reentrant walls to move towards the lens holding member.

2. In a device of the character described, a lens holding member comprising a pair of spaced lens holding ears adapted to hold a lens between them, and a flexible member adapted to engage the edge of the lens held between the ears, said member having a concaved surface on the lens engaging side and a reentrant portion on the opposite side thereof, the portion of the lens holding member between the ears being inserted in said reentrant portion and the upper and lower walls of the reentrant portion being of a shape to provide a clearance space between the outer edges of said walls and the lens holding member, said flexible member being most flexible between the limits of said reentrant portion whereby when the member held between the ears is straightened to make the concaved surface less concave it will flex between the limits of said reentrant portion and cause the upper and lower reentrant walls to move towards the lens holding member.

3. In a device of the character described, a lens holding member and a flexible member in engagement with said lens holding member, adapted to engage the edge of the lens, said flexible member having a concave surface on the lens engaging side and a reentrant portion on the opposite side thereof, said reentrant portion having a curved convex bottom surface, a portion of the lens holding member being inserted in said reentrant portion and having a concaved portion adapted to receive the curved convex bottom of the reentrant portion, wherein said member in engagement with the lens holding member will be self adjusting to fit the edge of the lens, and the upper and lower walls of the reentrant portion being of a shape to provide a clearance space between the outer edges of said walls and the lens holding member, said flexible member being most flexible between the limits of said reentrant portion whereby when the member in engagement with said lens holding member is straightened to make the concaved surface less concave it will flex between the limits of said reentrant portion and cause the upper and lower reentrant walls to move towards the lens holding member.

4. In a device of the character described, a lens holding member comprising a pair of spaced lens holding ears, adapted to hold a lens between them and a flexible member adapted to engage the edge of the lens held between the ears, said flexible member having a concaved surface on the lens engaging side, and a reentrant portion on the opposite side thereof, said reentrant portion having a curved convex bottom, the portion of the lens holding member between the ears being inserted in said reentrant portion and having a curved portion adapted to receive the curved convex bottom, wherein said member held between the ears will be self adjusting to fit the edge of the lens and the upper and lower walls of the reentrant portion being of a shape to provide a clearance space between the outer edges of said walls and the lens holding members, said flexible member being most flexible between the limits of said reentrant portion whereby when the member held between the ears is straightened to make the concaved surface less concave it will flex between the limits of said reentrant portion and cause the upper and lower reentrant walls to move towards the lens holding member.

ROYAL H. SIMONDS.